US012157835B2

(12) United States Patent
Pujar et al.

(10) Patent No.: US 12,157,835 B2
(45) Date of Patent: Dec. 3, 2024

(54) CORROSION INHIBITION SYSTEM PRIMERS AND ADHESIVES FOR METAL BOND STRUCTURES

(71) Applicant: ROHR, INC., Chula Vista, CA (US)

(72) Inventors: Vijay V. Pujar, Rancho Santa Fe, CA (US); Steven A. Poteet, Hamden, CT (US); Blair A. Smith, South Windsor, CT (US)

(73) Assignee: ROHR, INC., Chula Vista, CA (US)

( * ) Notice: Subject to any disclaimer, the term of this patent is extended or adjusted under 35 U.S.C. 154(b) by 252 days.

(21) Appl. No.: 17/198,969

(22) Filed: Mar. 11, 2021

(65) Prior Publication Data
US 2021/0309886 A1 Oct. 7, 2021

Related U.S. Application Data

(60) Provisional application No. 63/006,610, filed on Apr. 7, 2020.

(51) Int. Cl.
*C09J 1/00* (2006.01)
*B32B 7/12* (2006.01)
(Continued)

(52) U.S. Cl.
CPC ............... *C09J 1/00* (2013.01); *B32B 7/12* (2013.01); *B32B 15/01* (2013.01); *C09D 1/00* (2013.01); *C09D 5/002* (2013.01); *C25D 11/02* (2013.01)

(58) Field of Classification Search
CPC ... C09J 1/00; B32B 7/12; B32B 15/01; C09D 1/00; C09D 5/002; C25D 11/02
See application file for complete search history.

(56) References Cited

U.S. PATENT DOCUMENTS 9,433,975 B2 9/2016 Chakraborty et al.
10,017,649 B2 7/2018 Virtanen
(Continued)

FOREIGN PATENT DOCUMENTS

CN 110358395 10/2019
EP 3378903 9/2018
(Continued)

OTHER PUBLICATIONS

European Patent Office, European Search Report dated Aug. 10, 2021 in Application No. 21167266.2.
(Continued)

*Primary Examiner* — Robert S Walters, Jr.
(74) *Attorney, Agent, or Firm* — SNELL & WILMER L.L.P.

(57) ABSTRACT

A method of forming an adhesively bonded structure may comprise applying a primer compound to a first substrate, wherein the primer compound comprises a functionalized nanomaterial dopant, drying the primer compound on the substrate to form a primer layer comprising the functionalized nanomaterial dopant, applying an adhesive compound over the primer layer to form an adhesive layer, wherein the adhesive compound comprises the functionalized nanomaterial dopant, contacting the adhesive layer with a second substrate and curing the adhesive layer to form an adhesively bonded structure, wherein the first substrate is metallic and the second substrate is at least one of metallic or composite.

12 Claims, 6 Drawing Sheets

(51) Int. Cl.
*B32B 15/01* (2006.01)
*C09D 1/00* (2006.01)
*C09D 5/00* (2006.01)
*C25D 11/02* (2006.01)

(56) References Cited

U.S. PATENT DOCUMENTS

| | | |
|---|---|---|
| 10,150,874 B2 | 12/2018 | Bohm et al. |
| 11,603,474 B2 * | 3/2023 | Poteet .................... C09D 5/084 |
| 2017/0002459 A1 | 1/2017 | Lenczowski et al. |
| 2018/0186124 A1 | 7/2018 | Zhao et al. |
| 2018/0274103 A1 | 9/2018 | Poteet |
| 2019/0169443 A1 | 6/2019 | Poteet |
| 2019/0382594 A1 | 12/2019 | Yang et al. |

FOREIGN PATENT DOCUMENTS

| | | | |
|---|---|---|---|
| WO | WO-2014186151 A1 * | 11/2014 | ........... C08G 59/245 |
| WO | 2019020999 | 1/2019 | |

OTHER PUBLICATIONS

European Patent Office, European Office Action dated Apr. 15, 2024 in Application No. 21167266.2.

* cited by examiner

CORROSION INHIBITION SYSTEM PRIMERS AND ADHESIVES FOR METAL BOND STRUCTURES

CROSS-REFERENCE TO RELATED APPLICATIONS

This application claims priority to, and the benefit of, Provisional Patent Application Ser. No. 63/006,610, filed Apr. 7, 2020 and titled "CORROSION INHIBITION SYSTEM PRIMERS AND ADHESIVES FOR METAL BOND STRUCTURES," which is incorporated by reference herein in its entirety for all purposes.

FIELD

The present disclosure relates generally to corrosion inhibition systems for substrates.

BACKGROUND

Metal substrates used for bonded metal-to-metal structures and metal-to-composite structures with an adhesive may be susceptible to corrosion in certain environments, such as the environments in which the components, tools or machines comprising the metal substrates are used. Protective coatings comprising of hexavalent chromium are often used on these surfaces to provide corrosion inhibition systems. However, conventionally-used hexavalent chromium is toxic. Therefore, adhesively bonded metal structures free of hexavalent chromium which simultaneously provide comparable corrosion inhibition to systems including hexavalent chromium, are desired.

SUMMARY

In various embodiments, a method of forming an adhesively bonded structure comprises applying a primer compound to a first substrate, wherein the primer compound comprises a functionalized nanomaterial dopant, drying the primer compound on the first substrate to form a primer layer comprising the functionalized nanomaterial dopant, applying an adhesive compound over the primer layer to form an adhesive layer, wherein the adhesive compound comprises the functionalized nanomaterial dopant, contacting the adhesive layer with a second substrate and curing the adhesive layer to form an adhesively bonded structure, wherein the first substrate is metallic and the second substrate is at least one of metallic or composite.

In various embodiments, the functionalized nanomaterial dopant comprises a nanomaterial dopant and a functionalizer, wherein the nanomaterial dopant comprises at least one of graphene nanoplatelets, carbon nanotubes, and carbon nanofibers, and wherein the functionalizer comprises at least one of an organosilane, an oxysilane, an amine, an epoxide, a mercapto group, a phosphate ester, a titanate, an aliphatic species, an aromatic species, or a compound formed via esterification.

In various embodiments, the method includes applying a sealing solution to an anodized surface of at least one of the first substrate or the second substrate, wherein the sealing solution comprises the nanomaterial dopant and a corrosion inhibiting compound, wherein the corrosion inhibiting compound comprises at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium, and drying the sealing solution on the respective substrate to form a sealing layer comprising the nanomaterial dopant and the corrosion inhibiting compound.

In various embodiments, the nanomaterial dopant comprises oxygen on a nanomaterial surface of the nanomaterial dopant. In various embodiments, the nanomaterial dopant of the sealing solution is functionalized by adding the at least one of the organosilane or the oxysilane to the sealing solution comprising the nanomaterial dopant such that the at least one of the organosilane or the oxysilane bond with the nanomaterial dopant. In various embodiments, the primer layer comprises at least one of an epoxy or an alkyd. In various embodiments, the method includes applying an anodizing solution to at least one of the first substrate or the second substrate to form an anodized surface of the respective substrate, wherein the anodizing solution comprises at least one of sulfuric acid, chromic acid, boric acid-sulfuric acid, tartaric acid-sulfuric acid, phosphoric acid, oxalic acid.

In various embodiments, the method includes applying an adhesion promotor solution to at least one of the first substrate or the second substrate and drying the adhesion promotor solution prior to applying the primer compound. In various embodiments, the adhesion promotor solution is a sol-gel comprising zirconium propionate. In various embodiments, the adhesion promotor solution is a sol-gel comprising the functionalized nanomaterial dopant, wherein the sol-gel is functionalized with at least one of an organosilane, an oxysilane, an amine, an epoxide, a mercapto group, a phosphate ester, a titanate, an aliphatic species, an aromatic species, or a compound that may form via esterification, and wherein the sol-gel is configured to strengthen the adherence of the respective substrate to the primer layer.

In various embodiments, the functionalizer bonds with the nanomaterial dopant. In various embodiments, the primer compound comprises a primer corrosion inhibiting compound comprising at least one of a trivalent chromium compound, a trivalent praseodymium compound, siloxanes, silicates, orthophosphates, molybdates, or a compound comprising at least one of elemental or ionic praseodymium, cerium, cesium, lanthanum, zinc, lithium, magnesium, or yttrium. In various embodiments, adhesion of the primer layer to at least one of the adhesive layer, a sealing layer, an anodized layer, or the respective substrate is strengthened via the functionalization of the nanomaterial dopant. In various embodiments, the functionalized nanomaterial dopant of the primer compounded comprises a first functionalization and the functionalized nanomaterial dopant of the adhesive compound comprises a second functionalization, wherein the first functionalization differs from the second functionalization.

In various embodiments, an adhesively bonded structure comprises a first substrate, a second substrate, and a corrosion inhibiting adhesive system disposed therebetween comprising a primer layer including a functionalized nanomaterial dopant, and an adhesive layer disposed on the primer layer including the functionalized nanomaterial dopant wherein the functionalized nanomaterial dopant comprises a nanomaterial dopant and a functionalizer, wherein the nanomaterial dopant comprises at least one of graphene nanoplatelets, carbon nanotubes, and carbon nanofibers, and wherein the functionalizer comprises at least one of an organosilane, an oxysilane, an amine, an epoxide, a mercapto group, a phosphate ester, a titanate, an aliphatic species, an aromatic species, or a compound formed via esterification.

In various embodiments, the first substrate is metallic and the second substrate is at least one of metallic or composite. In various embodiments, a core layer is disposed between the first substrate and the second substrate and in contact with the adhesive layer. In various embodiments, a sealing layer disposed on an anodized surface of the first substrate, wherein the sealing layer comprises a corrosion inhibiting compound comprising at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium. In various embodiments, the nanomaterial dopant comprises oxygen on a nanomaterial surface. In various embodiments, the primer layer is adhered to at least one of the respective substrate or the adhesive layer via the nanomaterial dopant being functionalized.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
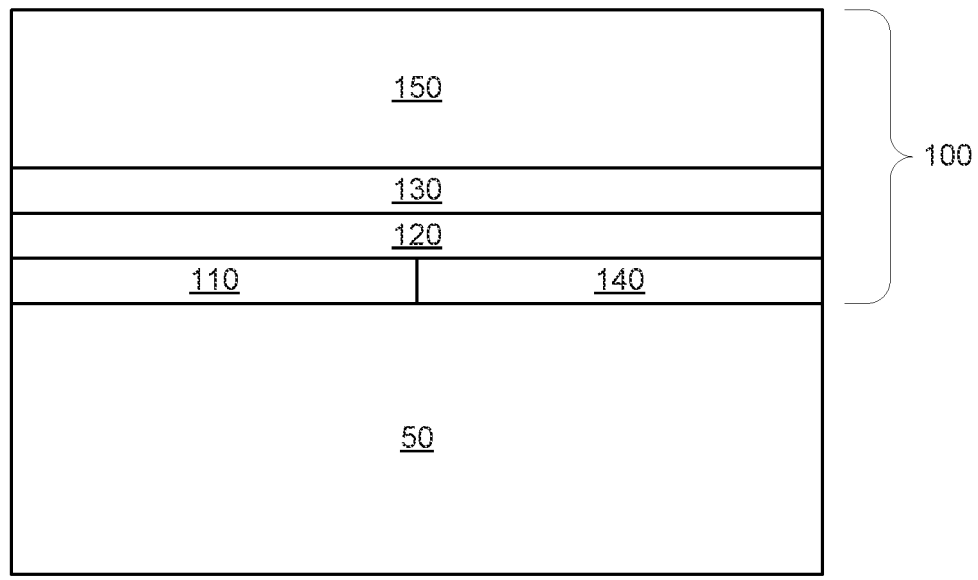
FIG. 1 illustrates schematic drawings of a substrate with a corrosion inhibiting adhesive system disposed thereon, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Value ranges include their minimum and maximum limits. Also, any reference to attached, fixed, connected, or the like may include permanent, removable, temporary, partial, full and/or any other possible attachment option. Also, it should be understood that while various embodiments discussed herein may make reference to a specific nanomaterial dopant (e.g., graphene nanoplatelets), such references are for purposes of illustration only, and the same or similar benefits and/or effects may be achieved by the use of other nanomaterial dopants replacing or in combination with the specific nanomaterial dopant used in the respective example or embodiment.

Corrosion inhibiting adhesive systems used on metal-bonded and metal coated substrates are used in many industries. For example, metal substrates or components in aircraft or other vehicles, such as automobiles, trains, and heavy equipment, may be coated with a corrosion inhibition system, and components may be bonded together with an adhesive system. In addition, metal substrates are found in construction contexts, such as used on building infrastructures.

As used herein, a "substrate" may include any metal and/or metal-coated material, a plastic, a ceramic or a fiber-reinforced composite. For example, a substrate may comprise iron, coated iron, steel, coated steel, stainless steel, coated stainless steel, nickel and/or nickel alloys, coated nickel/nickel alloy, aluminum or aluminum alloy, coated aluminum/aluminum alloy, magnesium and/or magnesium alloy, titanium and/or titanium alloy, coated titanium/titanium alloy, bronze, coated bronze, copper beryllium, coated copper beryllium, zinc and/or zinc alloys, and/or coated zinc or zinc-nickel alloys. A layer of a corrosion inhibition system may be applied by any suitable method, such as spraying or painting a solution that will form a layer of the corrosion inhibition system on the substrate, submerging the substrate in a solution that will form a layer of the corrosion inhibition system on the substrate, or the like. In various embodiments, a substrate may comprise aluminum and/or an aluminum alloy, and/or magnesium and/or a magnesium alloy.

With reference to FIG. 1, in various embodiments, a substrate 50 may comprise a corrosion inhibiting adhesive system 100. Substrate 50 may be any of the substances described herein, such as aluminum metal or an aluminum alloy, including aluminum alloys in the International Alloy Designation System 2000 series, 6000 series and 7000 series, cold-rolled or stainless steels, or zinc-nickel alloys.

Figure 2A:
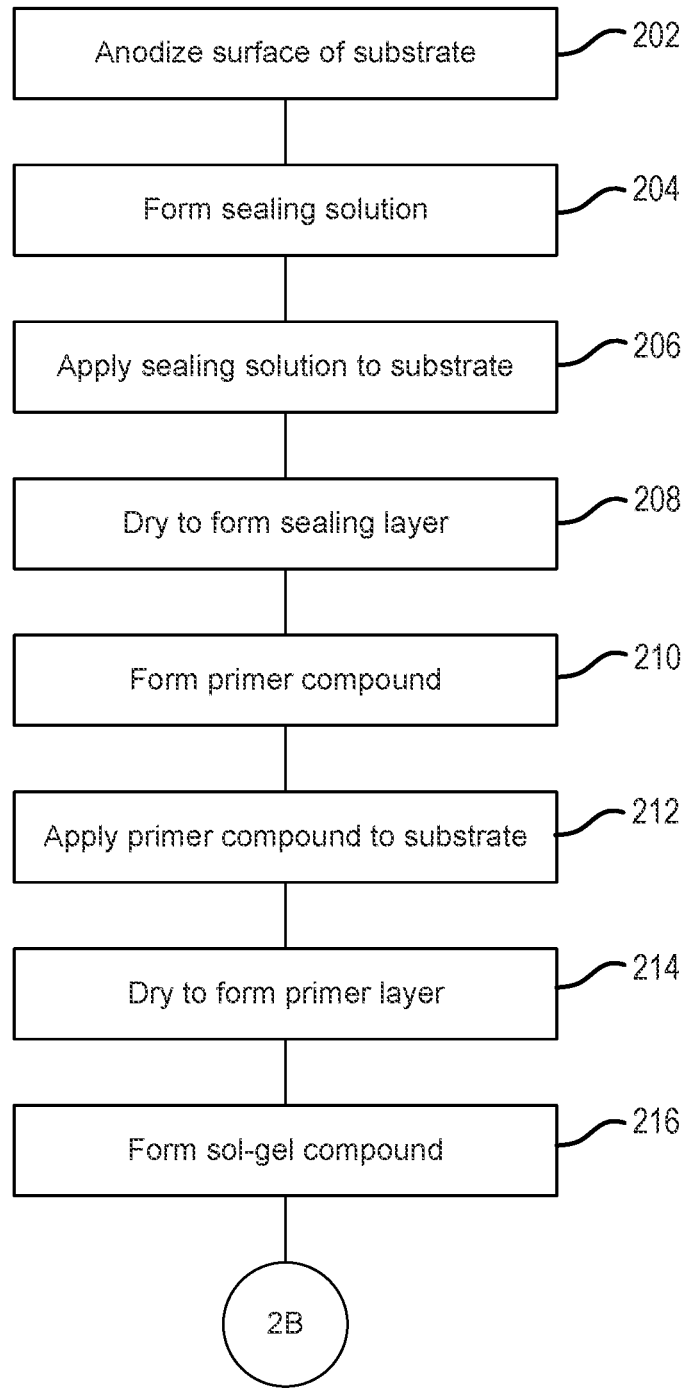
FIG. 2A illustrates a method for disposing a corrosion inhibition system on a substrate, in accordance with various embodiments.
Figure 2B:
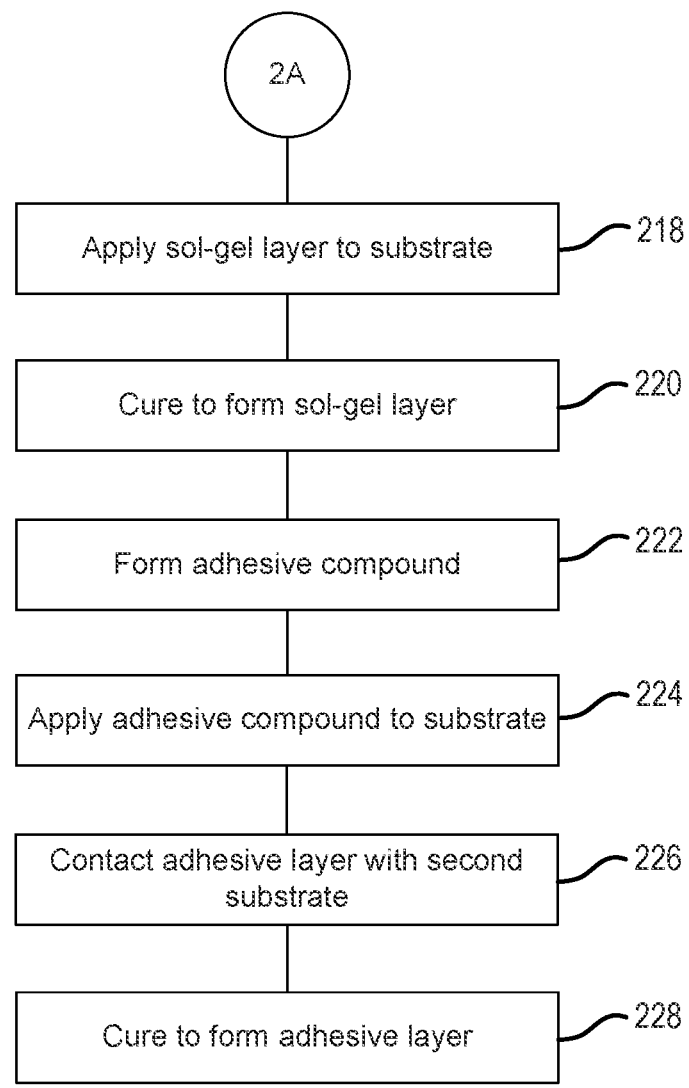
FIG. 2B illustrates a method for disposing a corrosion inhibition system on a substrate, in accordance with various embodiments.

In various embodiments, corrosion inhibiting adhesive system 100 may comprise an anodized layer 110, a sealing layer 120, and/or a primer layer 130. With additional reference to FIG. 2, and method 200 for disposing a corrosion inhibition system on a substrate, an outer surface of substrate 50 may be anodized (step 202) to form anodized layer 110. Anodizing of substrate 50 may be performed by any suitable method. For example, an anodizing solution comprising sulfuric acid, chromic acid, phosphoric acid, boric acid-sulfuric acid, tartaric acid-sulfuric acid, oxalic acid, and/or any other suitable substance may be applied to substrate 50 (e.g., substrate 50 may be submerged in a bath of such an anodizing solution). As another example, an anodizing solution comprising ammonium acid fluoride, sodium dichromate and phosphoric acid, and/or any other suitable substance may be applied to substrate 50. As yet another example, an anodizing solution comprising potassium hydroxide, potassium fluoride, aluminum hydroxide, trisodium phosphate, potassium permanganate, and/or any other suitable substance may be applied to substrate 50. Anodized layer 110 may be formed on substrate 50 as a result of the interaction between substrate 50 and the anodizing solution. Application of the anodizing solution to substrate 50 may be for any suitable duration (e.g., between 5 and 20 minutes, or between 5 and 120 minutes).

In various embodiments, anodized layer 110 may be comprised in substrate 50. Anodized layer 110 may be porous. A pore of the plurality of pores in anodized layer 110 may have a cross section taken on a plane parallel to the outer surface of substrate 50 that is between about 12 to about 15 nanometers (0.00000047 to 0.00000059 inch) across (wherein "about" as used in this context means plus or minus 4 nanometers). In various embodiments, a pore of the plurality of pores may be about 10 microns across.

In various embodiments, continuing with method 200, a sealing solution may be formed (step 204). The sealing solution may comprise a nanomaterial dopant and/or a corrosion inhibiting compound. In various embodiments, the nanomaterial dopant may comprise graphene nanoplatelets, carbon nanotubes, and/or carbon nanofibers. The nanomaterial dopant may be added to the solution comprising the corrosion inhibiting compound. The corrosion inhibiting compound may comprise a trivalent chromium compound (e.g., chromium(III) oxide), a trivalent praseodymium compound (e.g., praseodymium(III) oxide), nickel acetate, cobalt acetate, siloxanes, silicates, silicic acid, phosphates (e.g., aluminum phosphate), orthophosphates, molybdates, and/or a compound comprising at least one of elemental or ionic praseodymium (e.g., praseodymium(III) oxide), cerium (e.g., cerium oxide), cesium (e.g., cesium oxide), lanthanum (e.g., lanthanum oxide), zinc (e.g., trizinc bis (orthophosphate)), lithium (e.g., lithium carbonate), molybdenum (e.g., molybdenum oxide), magnesium (e.g., magnesium silicate), or yttrium (e.g., yttrium oxide). In various embodiments, the corrosion inhibiting compound may comprise a hexavalent chromium compound. The sealing solution may comprise between about 0.1 and 10% by weight or between about 0.5 to 5% by weight nanomaterial dopant (e.g., graphene nanoplatelets) (wherein "about" as used in this context means plus or minus 2 wt %). In various embodiments, the sealing solution may comprise chromium sulfate ($Cr_2(SO_4)_3$). In various embodiments, the sealing solution may comprise chromium sulfate and/or sodium fluorosilicate ($Na_2SiF_6$) in a solvent or carrier fluid (e.g., water). In various embodiments, the sealing solution may comprise polytetrafluoroethene (PTFE).

In various embodiments, the nanomaterial dopant may be functionalized to enhance (e.g., strengthen) interactions and/or bonding between the layers of corrosion inhibiting adhesive system 100 and/or compounds within the sealing layer 120, the primer layer 130, and/or the adhesive layer 150. For example, in embodiments in which the nanomaterial dopant comprises graphene nanoplatelets (or other suitable nanomaterial dopant), the graphene nanoplatelets (or other suitable nanomaterial dopant) may be functionalized by functionalizing compounds such as, for example, organosilanes and/or oxysilanes. In various embodiments, a functionalizing compound used to functionalize the nanomaterial dopant may comprise organosilanes, oxysilanes, amines, epoxides, mercapto groups, phosphate esters, titanates, aliphatic species, aromatic species, and/or (other) compounds that may form via esterification. Functionalizing compounds may be added to a solution and/or suitable solvent containing the nanomaterial dopant in a dispersion to functionalize the nanomaterial dopant. Without being bound by theory, one or more components of the nanomaterial dopant solution may hydrolyze a portion of an organosilane or oxysilane (or other functionalizing compound), which may allow that organosilane or oxysilane (or other functionalizing compound) to bond or react with the nanomaterial dopant. Or, the organosilane or oxysilane (or other functionalizing compound) may interact with or react with nanomaterial dopant (e.g., in the case of graphene nanoplatelets, interact or react with the oxides on the surface of the graphene nanoplatelets) to bond the organosilane or oxysilane (or other functionalizing compound) to the nanomaterial dopant.

In various embodiments, the sealing solution, a primer compound, and/or an adhesive compound may comprise multiple functionalizing compounds, which may functionalize the nanomaterial dopant(s) differently, such that there are different nanomaterial dopants in the respective solution and/or compound (caused by the different functionalization). For example, a first functionalizing compound (e.g., a first organosilane, oxysilane, or any other suitable compound) may be added to the sealing solution and/or nanomaterial dopant solution, which may functionalize the nanomaterial dopant in a first manner to better adhere the resulting sealing layer 120 to substrate 50 via the first functionalized nanomaterial dopant. A second functionalizing compound (e.g., a second organosilane, oxysilane, or any other suitable compound) may be added to the primer compound and/or nanomaterial dopant solution (simultaneously, at a different time, and/or to a separate solution that will be combined with the solution comprising the first functionalizing compound), which may functionalize the nanomaterial dopant in a second manner to better adhere the resulting sealing layer 120 to the primer layer 130 via the second functionalized nanomaterial dopant.

In various embodiments, the graphene nanoplatelets may comprise a surface comprising between 1% and 15% oxygen (e.g. as graphene oxides or secondarily as ketones, hydroxyl groups, carboxyl groups, and/or the like), allowing the organosilanes and/or oxysilanes (or other functionalizing compound) to interact, react, and bond with the graphene nanoplatelets and the surface oxygen thereon. For example, a triethoxysilane may be used to functionalize the graphene nanoplatelets. One of the ethoxy groups may be hydrolyzed from the triethoxysilane, and that location on the molecule may bond with oxygen on the graphene nanoplatelets. The other components of the molecule (organosilane, oxysilane, and/or other functionalizing compound) used to functionalize the graphene nanoplatelets may be selected to better bond sealing layer 120 to primer layer 130. For example, on the triethoxysilane discussed above, the fourth component bonded to the silicon atom may be amine-terminated. In various embodiments, the functionalized graphene nanoplatelets may bond to hydroxyl groups on substrate 50, for example, in anodized layer 110 (e.g., alumina hydroxy for a substrate 50 comprising aluminum).

The sealing solution may be applied to substrate 50 (step 206). For example, the sealing solution may be applied directly to anodized layer 110. The sealing solution may be applied to substrate 50 in any suitable manner, such as painting, brushing, or spraying the sealing solution onto substrate 50, and/or submerging substrate 50 in the sealing solution. For example, submerging substrate 50 in the sealing solution may be performed at any suitable temperature (e.g., from about 20° C. to about 100° C.) for any suitable duration (e.g., from about 1 minute to 60 minutes). In response, the sealing solution may be dried to form sealing layer 120 (step 208). In various embodiments, the formation of sealing layer 120 may be performed by a trivalent chromium process.

In various embodiments, sealing layer 120 may comprise between 0.025 and 3.5% weight nanomaterial dopant, between 0.05 and 2% by weight nanomaterial dopant, between 0.05 and 1.5% by weight nanomaterial dopant, or any other suitable compositional makeup. In various embodiments, sealing layer 120 may be between 30 millionths of an inch (76 nanometers) and 0.001 inch (25.4 micrometers).

In various embodiments, the graphene nanoplatelets (or other suitable nanomaterial dopant) in the sealing solution and sealing layer 120 may be about 1 micrometer (0.000039 inch) (wherein "about" in this context means plus or minus 0.5 micrometer), or between 0.05 micrometer (0.000019 inch) and 5 micrometers (0.00002 inch), or between 0.05 micrometer (0.000019 inch) and 25 micrometers (0.001 inch) across. Therefore, because the graphene nanoplatelets may have a larger cross-sectional area than the pores in anodized layer 110, the graphene nanoplatelets of the sealing solution may remain at the top of sealing layer 120 (i.e., outside the pores of anodized layer 110, the top of sealing layer 120 being the portion of sealing layer 120 furthest from substrate 50), while the other components of the sealing solution infiltrate the pores of anodized layer 110.

Without being bound by theory, it is thought that the graphene nanoplatelets may form protective sheets to mitigate and prevent corrosion on substrate 50. That is, the graphene nanoplatelets may form a layer at the top of sealing layer 120 (the edge of sealing layer 120 furthest from substrate 50), which may comprise multiple sheets of graphene nanoplatelets, providing a barrier to prevent corrosion on substrate 50, for example, by blocking a galvanic relationship between substrate 50 (e.g., which may comprise aluminum) and any other substances with which substrate 50 and corrosion inhibiting adhesive system 100 may come in contact or interact. Such interaction between the graphene nanoplatelets may be facilitated by the functional groups on the graphene nanoplatelets from the functionalization. In various embodiments, PTFE may impregnate the pores of anodized layer 110, such that the PTFE seals anodized layer 110. In various embodiments, anodized layer 110 and sealing layer 120 may be overlapping.

If graphene nanoplatelets penetrate the pores of anodized layer 110, the graphene nanoplatelets in contact or close proximity with substrate 50 may create a risk of forming a galvanic cell between the graphene nanoplatelets and substrate 50. Therefore, the graphene nanoplatelets creating a layer at the top of sealing layer 120 may be advantageous.

In various embodiments, to further prevent graphene nanoplatelets from infiltrating the pores of anodized layer 110, and thus, mitigating the risk of a galvanic cell being formed between the graphene nanoplatelets and substrate 50, nickel acetate and/or cobalt acetate may be comprised in the sealing solution. Nickel acetate and/or cobalt acetate may form precipitates, which may fill and/or block the pores in anodized layer 110, blocking graphene nanoplatelets from infiltrating the pores in anodized layer 11. Therefore, the risks associated with graphene nanoplatelets infiltrating the pores in anodized layer 110 may be mitigated and/or prevented.

Additionally, without being bound by theory, the graphene nanoplatelets (or other nanomaterial dopant) may have a synergistic relationship (e.g., interact and/or react) with the trivalent chromium compound and/or trivalent praseodymium compound in the sealing solution and/or sealing layer 120, which may form a uniform $Cr_2O_3$ and/or $Pr_2O_3$ layer. Additionally, the functionalized graphene nanoplatelets may oxidize the trivalent chromium and/or trivalent praseodymium from the sealing solution and/or sealing layer 120 into hexavalent chromium in situ in sealing layer 120. This self-healing chromium oxide and/or praseodymium oxide film on the surface of substrate 50 continues to prevent corrosion and prevents degradation over time of sealing layer 120 (e.g., by controlling the release of ions to damaged areas of the corrosion inhibiting adhesive system 100 and/or redirecting electron pathways).

Moreover, the functionalized graphene nanoplatelets may provide electrical conductivity, which may affect the potentials needed to induce corrosion. These properties create additional corrosion resistance for substrate 50, and particularly guard against scribe damage. Specifically, functionalized graphene nanoplatelets can sequester corrosion inhibitors near a site of substrate exposure to the environment, slowing corrosion at that site.

In various embodiments, anodized layer 110 and sealing layer 120 may be formed simultaneously. Therefore, steps 202-206 may be combined into one step of applying a slurry comprising, for example, sealing solution components. In such embodiments, anodized layer 110 and sealing layer 120 may be one layer, and/or anodized layer 110 and sealing layer 120 may be overlapping layers within corrosion inhibiting adhesive system 100.

In various embodiments, a conversion coating may be applied to substrate 50, and may react on and/or with a surface of substrate 50. In such embodiments, as a result, a self-healing film may be formed on substrate 50 in place of, or in addition to, anodized layer 110 and/or sealing layer 120.

In various embodiments, continuing with method 200, a primer compound may be formed (step 210). The primer compound may comprise the nanomaterial dopant. In various embodiments, the nanomaterial dopant may comprise graphene nanoplatelets, carbon nanotubes, and/or carbon nanofibers comprising materials, compositions, features, manufacturing techniques, and characteristics as described with respect to step 204.

In various embodiments, the nanomaterial dopant may be functionalized to enhance (e.g., strengthen) interactions and/or bonding between the layers of corrosion inhibiting adhesive system 100 and/or compounds within the primer compound and/or sol-gel layer 140 and/or an adhesive layer 150. In this regard, application of the sol-gel compound comprising a nanomaterial dopant to the substrate 50 may tend to increase the bonding interaction relatively between the substrate 50 primer layer 130. For example, in embodiments in which the nanomaterial dopant comprises graphene nanoplatelets (or other suitable nanomaterial dopant), the graphene nanoplatelets (or other suitable nanomaterial dopant) may be functionalized by functionalizing compounds such as organosilanes and/or oxysilanes. In various embodiments, a functionalizing compound used to functionalize the nanomaterial dopant may comprise amines, epoxides, mercapto groups, phosphate esters, titanates, aliphatic species, aromatic species, and/or (other) compounds that may form via esterification. Organosilanes and/or oxysilanes may be added to the nanomaterial dopant solution to functionalize the nanomaterial dopant.

Without being bound by theory, one or more components of the nanomaterial dopant solution may hydrolyze off a portion of an organosilane or oxysilane (or other functionalizing compound), which may allow that location on the organosilane or oxysilane (or other functionalizing compound) to bond or react with the nanomaterial dopant. In various embodiments, the organosilane or oxysilane (or other functionalizing compound) may interact with or react with nanomaterial dopant (e.g., in the case of graphene nanoplatelets, interact or react with the oxides on the surface of the graphene nanoplatelets) to bond the organosilane or oxysilane (or other functionalizing compound) to the nanomaterial dopant. In various embodiments, the nanomaterial dopant of the primer compound may comprise a different functionalization than the nanomaterial dopant of the sealing solution where a substrate is anodized and sealed with a sealing solution comprising nanomaterial dopant.

In this regard the functionalized nanomaterial dopant of the primer compound comprises a first functionalization and the functionalized nanomaterial dopant of the sealing solution comprises a second functionalization, wherein the first functionalization differs from the second functionalization. Stated another way, the sealing solution may comprise a first functionalization and the primer compound may comprise a second functionalization which differs from the first functionalization. In various embodiments, where a substrate that is treated with the sol-gel adhesion promoter, the nanomaterial dopant of the primer compound may comprise a different functionalization than the nanomaterial dopant in the sol-gel solution. Stated another way, the functionalized nanomaterial dopant of the primer compound comprises a first functionalization and the functionalized nanomaterial dopant of the sol-gel solution comprises a second functionalization, wherein the first functionalization differs from the second functionalization. In like regard, the functionalized nanomaterial dopant of the primer compounded may comprise a first functionalization and the functionalized nanomaterial dopant of an adhesive compound may comprise a second functionalization, wherein the first functionalization differs from the second functionalization. Each layer may comprise a respectively different functionalization (i.e., a first functionalization, a second functionalization, a third functionalization etc.) In this regard, the nanomaterial dopant may be tailored to enhance bonding between the respective immediately adjacent layers.

In various embodiments, the primer compound may comprise an epoxy, an alkyd, and/or polyurethane, which may comprise one or more non-chromate corrosion inhibitors. The non-chromate corrosion inhibitor can be praseodymium, manganese, silane, aluminum, zinc, or a rare earth metal depending on the desired anti-corrosion properties. In various embodiments, the primer may comprise a primer corrosion inhibiting compound, which may comprise any suitable material, including those discussed in reference to the corrosion inhibiting compound comprised in the sealing solution (e.g., a trivalent chromium compound, a trivalent praseodymium compound, siloxanes, silicates, orthophosphates, molybdates, and/or a compound comprising at least one of elemental or ionic praseodymium, cerium, cesium, lanthanum, zinc, lithium, magnesium, and/or yttrium).

The primer compound may comprise a base component, a catalyst component, and a thinner component. The primer compound may include a solvent, pre-polymers that will make a BPA (bisphenol-A-(epichlorhydrin)), bisphenol-A-(epichlorhydrin), gypsum, butan-2-ol, titanium dioxide, dipraseodymium trioxide, crystalline silica, rheological modifiers, epoxy resin, and/or pigments. The primer compound may be solvent-based and may comprise of solvents, opacifiers, rheological modifiers, and polymers, such as those found in 3M™ Scotch-Weld™ Structural Adhesive Primer EC-3905, or Henkel Corporation Aerospace Group Hysol® EA 9296 NC Primer or Solvay Engineered Materials Inc. BR 127 NC Primer. In various embodiments, the primer compound may be water-based and comprise of similar water-compatible ingredients such as those found in 3M™ Scotch-Weld™ Structural Adhesive Primer EW-5005, Henkel Corporation Aerospace Group Loctite EA 9258.1 Cr Free Primer, or Solvay Engineered Materials Inc. BR 6747-1 XNC Primer.

In various embodiments, the primer may be applied to substrate 50 (step 212). For example, the primer may be applied directly on anodized layer 110 and/or the layer comprising the sealing layer 120 and anodized layer 110 components, or the substrate 50 treated with the sol-gel adhesion promoter to form a sol-gel layer 140. The primer may be applied to substrate 50 (including any of the various layers, i.e. 110, 140) in any suitable manner, such as painting, brushing, or spraying the primer onto substrate 50, and/or submerging substrate 50 in the primer. In response, the primer may be dried to form primer layer 130 (step 214). Primer layer 130 may be disposed directly on anodized layer 110 and/or the layer comprising the sealing layer 120 and anodized layer 110 components. In various embodiments, primer layer 130 may be between 30 millionths of an inch (76 nanometers) and 0.001 inch (25.4 micrometers), and preferably between 0.0001 inch (2.5 micrometers) to 0.0004 inch (10 micrometers).

In various embodiments, continuing with method 200, an adhesion promotor solution such as a sol-gel (i.e., solution gelation) compound may be formed (step 216). The sol-gel compound may comprise the nanomaterial dopant. In various embodiments, the nanomaterial dopant may comprise graphene nanoplatelets, carbon nanotubes, and/or carbon nanofibers comprising materials, compositions, features, manufacturing techniques, and characteristics as described with respect to steps 204 and 210. In various embodiments, the sol-gel compound may comprise zirconium propionate.

In various embodiments, the nanomaterial dopant may be functionalized with a functionalizer to enhance (e.g., strengthen) interactions and/or bonding between the layers of corrosion inhibiting adhesive system 100 and/or compounds within the sol-gel compound and/or primer layer 130 and/or an adhesive layer 150. In this regard, application of the sol-gel compound may tend to increase the bonding interaction relatively between the primer layer 130 and the adhesive layer 150 and/or between the primer layer 130 and the substrate. For example, in embodiments in which the nanomaterial dopant comprises graphene nanoplatelets (or other suitable nanomaterial dopant), the graphene nanoplatelets (or other suitable nanomaterial dopant) may be functionalized by functionalizing compounds such as organosilanes and/or oxysilanes.

In various embodiments, a functionalizing compound used to functionalize the nanomaterial dopant may comprise amines, epoxides, mercapto groups, phosphate esters, titanates, aliphatic species, aromatic species, and/or (other) compounds that may form via esterification. Organosilanes and/or oxysilanes may be added to the nanomaterial dopant solution to functionalize the nanomaterial dopant. Without being bound by theory, one or more components of the nanomaterial dopant solution may hydrolyze off a portion of an organosilane or oxysilane (or other functionalizing compound), which may allow that location on the organosilane or oxysilane (or other functionalizing compound) to bond or react with the nanomaterial dopant. Or, the organosilane or oxysilane (or other functionalizing compound) may interact with or react with nanomaterial dopant (e.g., in the case of graphene nanoplatelets, interact or react with the oxides on the surface of the graphene nanoplatelets) to bond the organosilane or oxysilane (or other functionalizing compound) to the nanomaterial dopant. In various embodiments, the nanomaterial dopant of the sol-gel compound may comprise a different functionalization than the nanomaterial dopant of the sealing solution and/or the primer compound. In this regard, the nanomaterial dopant may be tailored to enhance bonding between the layers immediately adjacent to the sol-gel layer 140. Stated another way, the sol-gel composition may comprise a third functionalization which differs from the first functionalization and the second functionalization.

In various embodiments, the sol-gel compound may be applied to substrate 50 (step 218). For example, the sol-gel may be applied directly to substrate 50 after cleaning the substrate. The substrate may be cleaned with an abrasive, solvent, alkaline solution or a combination thereof as recommended by the manufacturer or using industry standard methods such as ASTM D3933. The sol-gel may be applied to substrate 50 in any suitable manner, such as painting, brushing, or spraying the sol-gel onto substrate 50, and/or submerging substrate 50 in the sol-gel. In response, the sol-gel may be cured to form sol-gel layer 140 (step 220). In various embodiments, sol-gel layer 140 may be less than 10 nanometers in thickness.

In various embodiments, continuing with method 200 includes forming an adhesive compound (step 222). In various embodiments, the adhesive compound may be epoxy based and comprise of organic and inorganic fillers and/or the like. The adhesive compound may comprise the nanomaterial dopant. In various embodiments, the nanomaterial dopant may comprise graphene nanoplatelets, carbon nanotubes, and/or carbon nanofibers comprising materials, compositions, features, manufacturing techniques, and characteristics as described with respect to steps 204, 210, and 216.

In various embodiments, the nanomaterial dopant may be functionalized to enhance (e.g., strengthen) interactions and/or bonding between the layers of corrosion inhibiting adhesive system 100 and/or compounds within the adhesive compound and/or primer layer 130. In this regard, application of the adhesive compound may tend to increase the bonding interaction relatively between the primer layer 130 and the adhesive layer 150. For example, in embodiments in which the nanomaterial dopant comprises graphene nanoplatelets (or other suitable nanomaterial dopant), the graphene nanoplatelets (or other suitable nanomaterial dopant) may be functionalized by functionalizing compounds such as organosilanes and/or oxysilanes. In various embodiments, a functionalizing compound used to functionalize the nanomaterial dopant may comprise amines, epoxides, mercapto groups, phosphate esters, titanates, aliphatic species, aromatic species, and/or (other) compounds that may form via esterification. Organosilanes and/or oxysilanes may be added to the nanomaterial dopant solution to functionalize the nanomaterial dopant. Without being bound by theory, one or more components of the nanomaterial dopant solution may hydrolyze off a portion of an organosilane or oxysilane (or other functionalizing compound), which may allow that location on the organosilane or oxysilane (or other functionalizing compound) to bond or react with the nanomaterial dopant. Or, the organosilane or oxysilane (or other functionalizing compound) may interact with or react with nanomaterial dopant (e.g., in the case of graphene nanoplatelets, interact or react with the oxides on the surface of the graphene nanoplatelets) to bond the organosilane or oxysilane (or other functionalizing compound) to the nanomaterial dopant. In various embodiments, the nanomaterial dopant of the adhesive compound may comprise a different functionalization than the nanomaterial dopant of the sealing solution, the sol-gel compound, and/or the primer compound. In this regard, the nanomaterial dopant may be tailored to enhance bonding between the layers immediately adjacent to the adhesive layer 150. Stated another way, the adhesive compound may comprise a fourth functionalization which differs from the first functionalization, the second functionalization, and the third functionalization.

Figure 3A:
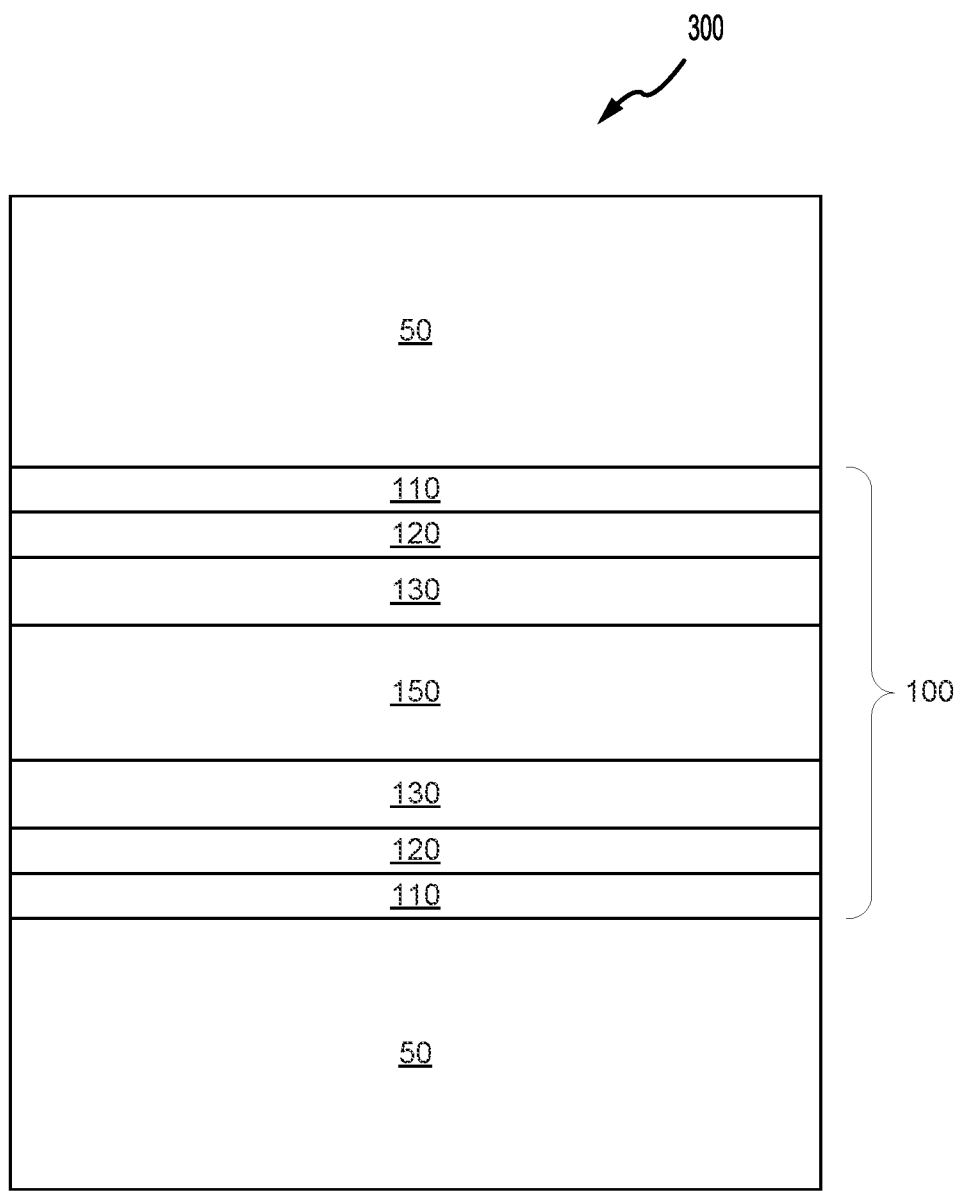
FIG. 3A illustrates an adhesively bonded structure including a corrosion inhibition system, in accordance with various embodiments.
Figure 3B:
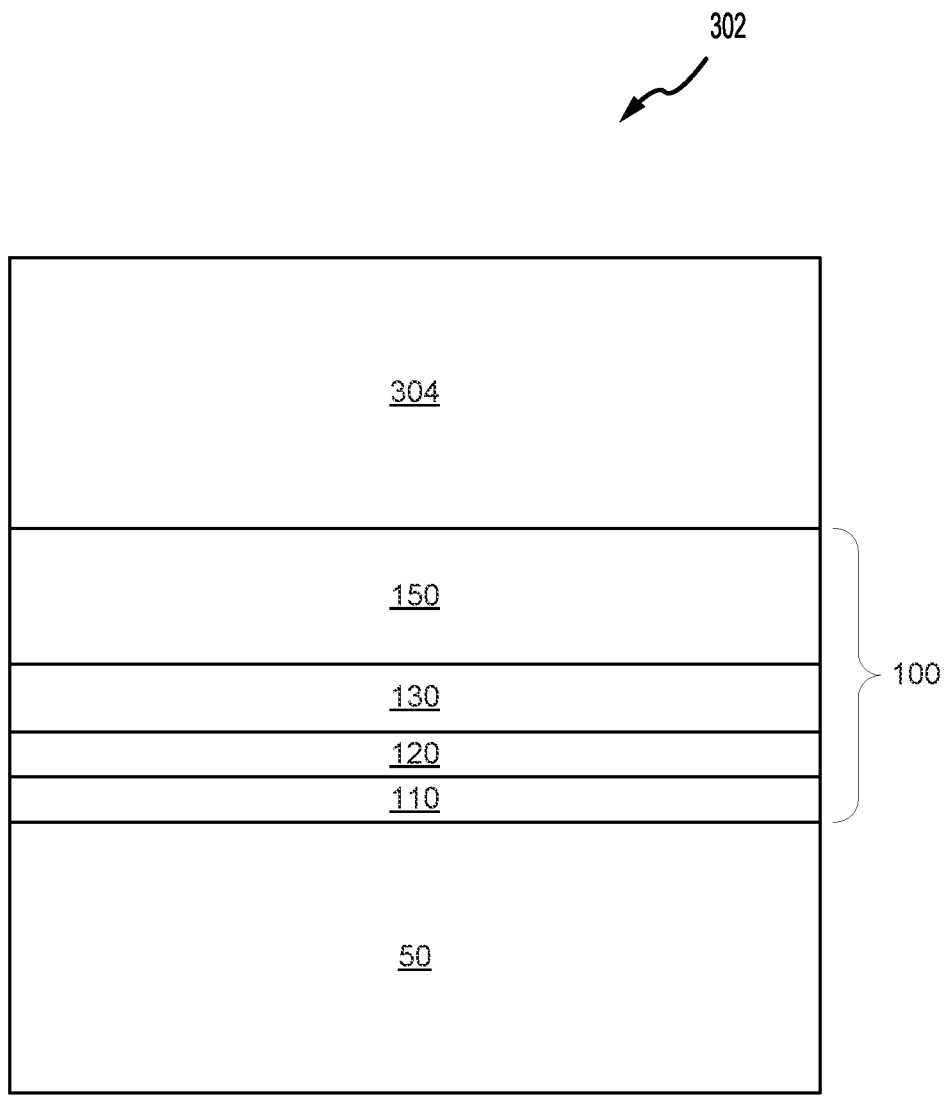
FIG. 3B illustrates an adhesively bonded structure including a corrosion inhibition system, in accordance with various embodiments.
Figure 3C:
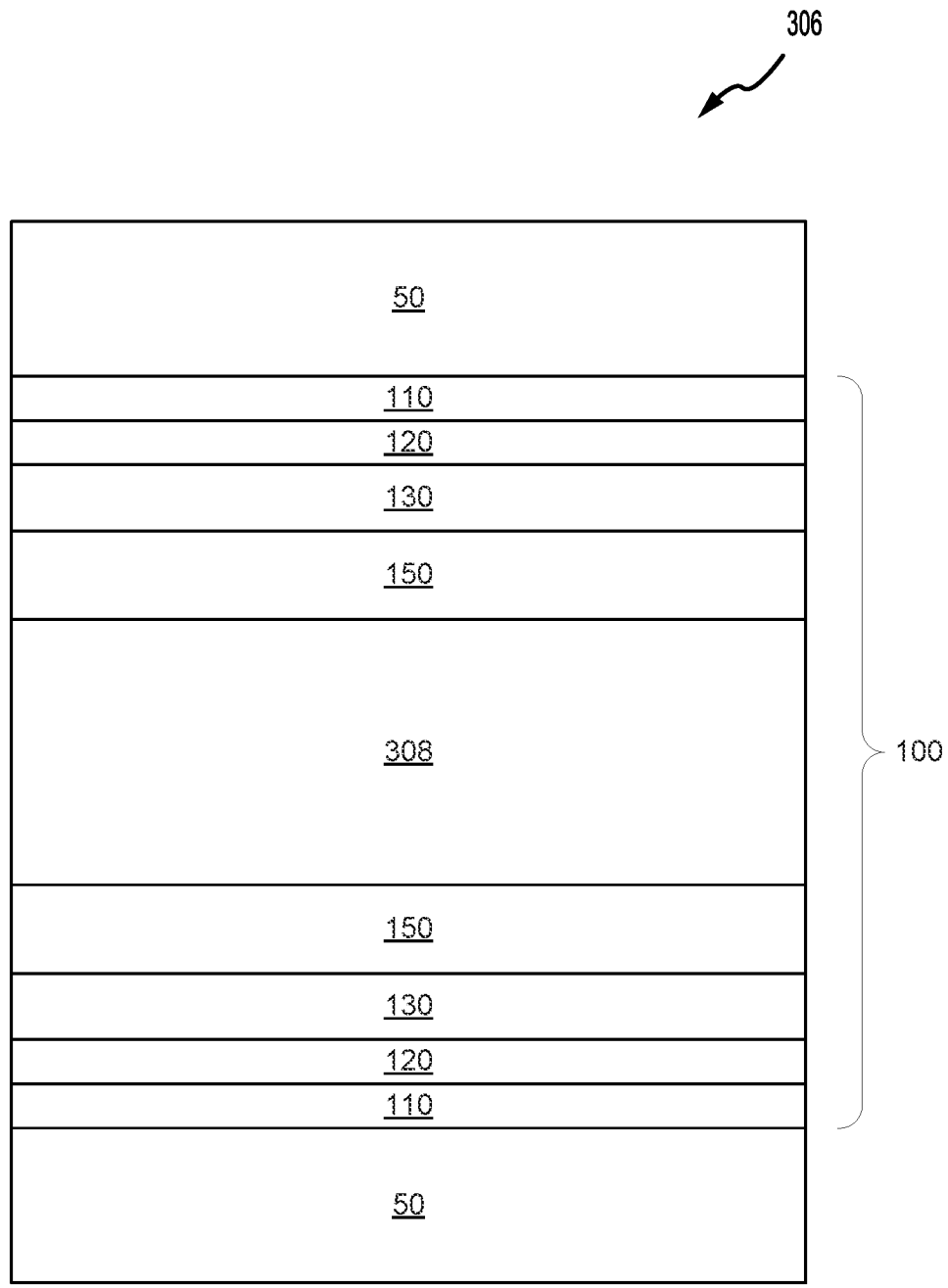
FIG. 3C illustrates an adhesively bonded structure including a corrosion inhibition system, in accordance with various embodiments.

In various embodiments, the adhesive compound may be applied to substrate 50 (step 224). For example, the adhesive compound may be applied directly to primer layer 130. The adhesive compound may be applied to substrate 50 in the form of a paste or in any other suitable manner, such as painting, brushing, or spraying the adhesive compound onto substrate 50, and/or submerging substrate 50 in the adhesive compound. In various embodiments, the adhesive compound may be formed as a thin film and may be applied to the substrate 50 as an adhesive film. In this regard, surfaces of the substrate are prepared for bonding. The adhesive compound may be contacted with a second substrate, for example, as shown in FIGS. 3A, 3B, and 3C (step 226). In response, the adhesive compound may be cured to form adhesive layer 150 (step 228). In this regard, the first substrate and the second substrate may be bonded at the contacting surfaces to form a structure. The steps of method 200 may be performed at any suitable temperature (e.g., ambient temperature, an elevated temperature, a variable temperature, and/or the like).

In various embodiments and with additional reference to FIG. 3A, an adhesively bonded structure 300 comprising corrosion inhibiting adhesive system 100 is illustrated. Structure 300 comprises substrates 50 which are treated to form respective anodized layers 110 and may be sealed with sealing layers 120. A primer layer (i.e., bond primer) 130 is applied to the respective substrates 50 which may then be joined via adhesive layer 150 to form structure 300.

In various embodiments and with additional reference to FIG. 3B, an adhesively bonded structure 302 comprising corrosion inhibiting adhesive system 100 is illustrated. Structure 302 comprises substrate 50 treated to form anodized layer 110 and sealed with sealing layer 120. Primer layer 130 is applied to the sealing layer 120. The substrate 50 is joined via an adhesive layer 150 to a composite substrate 304 to form structure 302.

In various embodiments and with additional reference to FIG. 3C, an adhesively bonded structure 306 comprising corrosion inhibiting adhesive system 100 is illustrated. Structure 306 comprises substrates 50 which are treated to form respective anodized layers 110 and sealed with sealing layers 120. A primer layer (i.e., bond primer) 130 is applied to the respective substrates 50 in preparation for boding. The adhesive compound is applied to the respective substrates and a honeycomb core layer 308 inserted between the substrates 50. The adhesive compound is cured to form adhesive layers 150 thereby bonding the honeycomb core layer 308 to the substrates 50 to form structure 306.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming an adhesively bonded structure, comprising:
    applying an adhesion promotor solution to a first substrate, wherein the adhesion promotor solution is a sol-gel including zirconium propionate;
    drying the adhesion promotor solution to a form a sol-gel layer;
    applying a primer compound to the sol-gel layer, wherein the primer compound comprises a first functionalized nanomaterial dopant;
    drying the primer compound on the sol-gel layer to form a primer layer comprising the first functionalized nanomaterial dopant;
    applying an adhesive compound over the primer layer to form an adhesive layer, wherein the adhesive compound comprises a second functionalized nanomaterial dopant;
    contacting the adhesive layer with a second substrate; and
    curing the adhesive layer to form an adhesively bonded structure, wherein the first substrate is metallic and the second substrate is at least one of metallic or composite.

2. The method of claim 1, wherein the first functionalized nanomaterial dopant comprises a nanomaterial dopant and a functionalizer, wherein the nanomaterial dopant comprises at least one of graphene nanoplatelets, carbon nanotubes, and carbon nanofibers, and wherein the functionalizer comprises at least one of an organosilane, an oxysilane, an amine, an epoxide, a mercapto group, a phosphate ester, a titanate, an aliphatic species, an aromatic species, or a compound formed via esterification.

3. The method of claim 2, further comprising:
    applying a sealing solution to an anodized surface of at least one of the first substrate or the second substrate, wherein the sealing solution comprises the nanomaterial dopant and a corrosion inhibiting compound,
    wherein the corrosion inhibiting compound comprises at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium; and
    drying the sealing solution on the respective substrate to form a sealing layer comprising the nanomaterial dopant and the corrosion inhibiting compound.

4. The method of claim 3, wherein the nanomaterial dopant of the sealing solution is functionalized by adding the at least one of the organosilane or the oxysilane to the sealing solution comprising the nanomaterial dopant of the sealing solution such that the at least one of the organosilane or the oxysilane bond with the nanomaterial dopant of the sealing solution.

5. The method of claim 2, wherein the nanomaterial dopant comprises oxygen on a nanomaterial surface of the nanomaterial dopant.

6. The method of claim 2, wherein the primer layer comprises at least one of an epoxy or an alkyd.

7. The method of claim 2, wherein the sol-gel adhesion promotor solution further includes the first functionalized nanomaterial dopant, wherein the sol-gel is functionalized with at least one of an organosilane, an oxysilane, an amine, an epoxide, a mercapto group, a phosphate ester, a titanate, an aliphatic species, an aromatic species, or a compound that may form via esterification, and wherein the sol-gel is configured to strengthen the adherence of the respective substrate to the primer layer.

8. The method of claim 2 wherein the functionalizer bonds with the nanomaterial dopant.

9. The method of claim 2, wherein adhesion of the primer layer to at least one of the adhesive layer, a sealing layer, an anodized layer, or the respective substrate is strengthened via the functionalization of the nanomaterial dopant.

10. The method of claim 2, wherein the first functionalized nanomaterial dopant of the primer compound comprises a first functionalization and the second functionalized nanomaterial dopant of the adhesive compound comprises a second functionalization, wherein the first functionalization differs from the second functionalization.

11. The method of claim 1, further comprising applying an anodizing solution to at least one of the first substrate or the second substrate to form an anodized surface of the respective substrate, wherein the anodizing solution comprises at least one of sulfuric acid, chromic acid, boric acid-sulfuric acid, tartaric acid-sulfuric acid, phosphoric acid, oxalic acid.

12. The method of claim 1, wherein the primer compound comprises a primer corrosion inhibiting compound comprising at least one of a trivalent chromium compound, a trivalent praseodymium compound, siloxanes, silicates, orthophosphates, molybdates, or a compound comprising at least one of elemental or ionic praseodymium, cerium, cesium, lanthanum, zinc, lithium, magnesium, or yttrium.

\* \* \* \* \*